UNITED STATES PATENT OFFICE.

WILLIAM P. CLOTWORTHY, OF BALTIMORE, MARYLAND.

IMPROVEMENT IN BAKING-POWDERS.

Specification forming part of Letters Patent No. 206,930, dated August 13, 1878; application filed July 19, 1878.

*To all whom it may concern:*

Be it known that I, WILLIAM P. CLOTWORTHY, of the city of Baltimore, in the State of Maryland, have invented a new and useful Compound for Lightening Bread, which compound is fully described in the following specification.

This invention relates to that class of compounds known as "baking-powders," and used as a substitute for yeast to lighten the various preparations of flour and meal in the processes by which they are transformed by the culinary art into bread, rolls, pone-cakes, and other articles of food; and it consists in the chemical adjustment of ammoniated potash-alum, from which the water of crystallization has been expelled by exsiccation, with bicarbonate of soda or other alkaline carbonate and starch, in such proportions as to retain the carbonic-acid gas until the application of heat in the process of baking commences.

To prepare the baking-powder, take a given quantity of ammoniated potash-alum and burn or calcine the same until the water of crystallization is expelled therefrom and it loses from forty-three to forty-eight per centum of its weight. This leaves a residue friable, nearly tasteless, and almost insoluble in cold water, but readily soluble in warm water. Add to this exsiccated alum an equal portion, by weight, of bicarbonate of soda or other alkaline carbonate, and a double proportion of powdered corn-starch. Mix all of these ingredients well together, and the composition is ready for use.

This compound will not act until the dough with which it is mixed is placed in a heated oven to be baked, when the application of heat causes the powder to give forth the carbonic-acid gas retained by it, and thus lighten the bread or cakes in process of making.

The same property renders it adaptable to any climate, easily kept for an indefinite period of time, and not requisite to be kept or carried in air-tight packages, but may be used, sold, and transported in bulk, like sugar or salt.

These are great advantages over any baking-powder now in use, which require the baker to have the oven hot, bake quickly, and never use a wet spoon, the reason for which is, that as soon as the water or milk used in mixing the dough comes in contact with such powders effervescence commences at once, and, unless the baking is done immediately, the carbonic-acid gas passes off, and the bread is heavy and unwholesome.

I am aware that alum has long been used in baking bread, and that the British Parliament enacted statutes prohibiting such use, because bakers used it for bleaching inferior flour and making bread white which would otherwise be dark and unsalable. This was a proper suppression of fraud upon the public; but it was directed against crude alum, or normal sulphate of alumina.

In my preparation all of the injurious properties of the alum are not only neutralized by exsiccation, but it is made conducive to the health. The ammonia, potash, and alumina part with their sulphuric acid, and, combining with the soda, set free the carbonic-acid gas and form a sulphate of soda, which is the principal ingredient in bitter-water and other natural mineral waters recommended by physicians for the cure of constipation. The quantity of alumina contained, which is both insoluble and tasteless, is so small that it scarcely exceeds the quantity of tartrate of lime in cream of tartar.

Various attempts have been made to use alum in baking-powders, in combination with alkaline carbonates; but they have all been unsuccessful on account of the amount of water (about fifty per centum) contained in the alum.

I am also aware that bicarbonate of soda and other alkaline carbonates have been used for bread-making purposes.

I do not therefore claim as original the use of either alum or alkaline carbonates for the purposes aforesaid, but expressly disclaim the use of crude alum and normal sulphate of alumina as injurious and unadapted to the end in view.

What I claim as new, and ask to have protected by Letters Patent, is—

As a baking-powder, a compound composed of exsiccated ammonia-alum, bicarbonate of soda, and corn-starch, substantially in the proportions and for the purposes specified.

WILLIAM P. CLOTWORTHY.

Witnesses:
    WILLIAM V. LOGAN,
    LEWIS B. BROWNE.